(12) United States Patent
Adams et al.

(10) Patent No.: US 9,194,509 B2
(45) Date of Patent: Nov. 24, 2015

(54) POWER BOOST ASSIST CLOSED DEVICE FOR ACTUATORS

(71) Applicant: GE Oil & Gas Pressure Control LP, Houston, TX (US)

(72) Inventors: Keith Adams, Katy, TX (US); David Daniel Comeaux, Houston, TX (US); Ben Calvin Holgate, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 193 days.

(21) Appl. No.: 14/028,906

(22) Filed: Sep. 17, 2013

(65) Prior Publication Data

US 2015/0076377 A1   Mar. 19, 2015

(51) Int. Cl.
| | |
|---|---|
| *F16K 31/122* | (2006.01) |
| *F16K 43/00* | (2006.01) |
| *E21B 33/06* | (2006.01) |
| *E21B 33/072* | (2006.01) |
| *E21B 34/02* | (2006.01) |
| *E21B 29/04* | (2006.01) |

(52) U.S. Cl.
CPC .............. *F16K 31/122* (2013.01); *E21B 33/063* (2013.01); *E21B 33/072* (2013.01); *E21B 34/02* (2013.01); *F16K 31/1225* (2013.01); *F16K 43/001* (2013.01); *E21B 29/04* (2013.01)

(58) Field of Classification Search
CPC .............. F16K 31/122; F16K 31/1221; F16K 31/1225; F16K 43/001; F16J 1/12; F16J 1/24; F15B 15/1447; E21B 34/02; E21B 33/06; E21B 33/063; E21B 29/04; Y10S 92/01
USPC ......... 251/31, 62, 63, 63.5, 63.6; 92/179, 255
See application file for complete search history.

(56) References Cited

U.S. PATENT DOCUMENTS

| 1,743,376 | A | * | 1/1930 | Murphy | 141/18 |
| 3,734,455 | A | * | 5/1973 | Natho et al. | 251/62 |
| 4,098,341 | A | * | 7/1978 | Lewis | 166/387 |

(Continued)

FOREIGN PATENT DOCUMENTS

| DE | 10334152 A1 | * | 2/2005 | | F16F 9/32 |
| EP | 2199538 A2 | | 6/2010 | | |
| GB | 2166786 A | | 5/1986 | | |

OTHER PUBLICATIONS

International Search Report and Written Opinion issued in connection with corresponding PCT Application No. PCT/US2014/054894 dated Apr. 7, 2015.

*Primary Examiner* — Craig Schneider
*Assistant Examiner* — Richard K Durden
(74) *Attorney, Agent, or Firm* — Bracewell & Giuliani LLP

(57) ABSTRACT

An apparatus for assisting an actuator to close a valve has a cylindrical booster housing with a central axis. The booster housing includes an upward facing piston cavity and a downward facing lower cavity with internal threads for selectively coupling with external threads of a piston head of a valve actuator. A bulkhead is formed between the piston cavity and the lower cavity. The bulkhead has an opening for selectively accepting an actuator stem of the valve actuator therethrough. A booster piston is located within the piston cavity. The booster piston has a piston mounting means located on its bottom side for selectively securing a top end of the actuator stem of the valve actuator to the booster piston. The booster piston is moveable upwards in an axial direction to move the valve from a lower open position to an upper closed position.

20 Claims, 4 Drawing Sheets

(56) References Cited

U.S. PATENT DOCUMENTS 4,687,017 A * 8/1987 Danko et al. ............. 137/315.01
5,002,087 A * 3/1991 Feild ............................ 137/489
5,590,867 A * 1/1997 Van Winkle .................... 251/1.3
6,244,560 B1 * 6/2001 Johnson ......................... 251/1.3
7,117,886 B2 * 10/2006 Kajitani et al. ............. 137/487.5
8,162,046 B2 * 4/2012 Jahnke ........................ 166/85.4

* cited by examiner

POWER BOOST ASSIST CLOSED DEVICE FOR ACTUATORS

BACKGROUND

1. Field of Invention

The present disclosure relates in general to valve actuators, and more particularly to a device to assist an actuator in closing a valve.

2. Description of Prior Art

A gate valve is a valve having a body and a bore through the body. A gate is positioned transverse to the body, and moves linearly to obstruct flow through the bore or allow flow through the bore. Gates typically have an aperture that aligns with the bore to allow flow. The gate is sometimes moved, or actuated, by a valve actuator.

The valve actuator can be pneumatic, diaphragm, piston, or hydraulic type actuator that urges a stem downward toward the valve to open the valve. A bonnet is usually connected to the valve, with the stem extending through the bonnet, and then the actuator is connected to the bonnet. Over time, valves may develop excessive gate drag, making it impossible for the actuator to move upward and fully close the valve. Silt and debris can become trapped in a valve, as well as gate and seal interface damage or excessive wear making it difficult or impossible to fully close. There may be times when an actuator does not have enough bonnet stem thrust or spring force to fully close a valve due to changing field conditions.

During oil and gas production, wirelines or tubular members are often lowered through some type of gate valve. Ideally, the wireline or tubular members is removed from the well before the gate valve is closed. However, in some situations wireline or tubular member removal prior to valve closure is not possible and the gate valve is closed on the wireline or tubular member. Some actuators can provide sufficient force to cut wirelines or tubular members. However, not all valves are designed to do so and in an emergency situation, a wireline or tubular member running through the valve may need to be cut to close the valve. The safety of field operations can be jeopardized when a valve is left in a semi-open position because the actuator can not apply the force required to close the valve completely.

Prior art solutions for non-production applications have used double acting actuators. However these are complicated and costly mechanisms. Some production applications require that the actuator will operate under extreme drilling conditions, and then seamlessly transition into less stringent production applications. For certain production applications a mechanical single acting fail safe close actuator is required and a double acting is not allowed. Production actuator design is generally less robust than the drilling actuator design.

SUMMARY OF THE INVENTION

The apparatus described herein will facilitate the use of a simple actuator, such as a mechanical single acting fail safe close actuator, even under extreme conditions. For example, it will allow such a simple actuator to be used during harsher drilling conditions and then transition to its duties as a production actuator, without the need to switch out a more robust actuator for the more simple actuator between operations.

An apparatus for assisting a valve actuator to close a valve can have a cylindrical booster housing with a central axis. The booster housing includes an upward facing piston cavity and a downward facing lower cavity with internal threads for selectively coupling with external threads of a piston head of the valve actuator. A bulkhead is formed between the piston cavity and the lower cavity. The bulkhead has an opening for selectively accepting an actuator stem of the valve actuator therethrough. The apparatus can also have a booster piston located within the piston cavity. The booster piston has a piston mounting means located on a bottom side of the booster piston for selectively securing a top end of the actuator stem of the valve actuator to the booster piston. The booster piston is moveable upwards in an axial direction to move the valve from a lower open position to an upper closed position.

In certain embodiments, the piston cavity has a fluid supply port extending from an outer surface of the booster housing to an upper inner bore of the piston cavity for injecting pressurized fluid into the piston cavity and causing the booster piston to move upwards. The apparatus can further include a solenoid valve connected to a pressurized fluid supply line. The solenoid valve is operable to regulate the delivery of pressurized fluid to the piston cavity.

In certain other embodiments, the piston mounting means is a thread profile on the booster piston that selectively mates with a thread profile on the top end of the actuator stem. A bulkhead seal can create a fluid seal between an outer surface of the actuator stem and an inner surface of the central opening of the bulkhead. A piston sealing means can create a fluid seal between an outer surface of the booster piston and an inner surface of the piston cavity.

In yet other embodiments, the booster housing can have a screw opening configured to allow a set screw to pass into the lower cavity and engage the piston head to limit relative movement between the piston head and the booster housing. The booster piston can have an alignment bearing for maintaining the axial alignment of the booster piston and the piston cavity.

In an alternative embodiment of the present invention, an apparatus for assisting a valve actuator to close a valve includes an upward facing piston cavity defined by an upper inner bore of a booster housing and a bottom upward facing surface. A fluid supply port extends from an exterior of the booster housing and into the upper inner bore of the piston cavity for supplying a pressurized fluid into the piston cavity. The apparatus also has a downward facing lower cavity defined by a lower inner bore of the booster housing and a downward facing top surface. Internal booster threads are formed on an inner surface of the lower inner bore for selectively mating with external threads of a valve actuator. A booster piston is located within the piston cavity, the booster piston having a thread profile located on a bottom side of the booster piston for selectively mating with a thread profile on a top end of an actuator stem of the valve actuator. The pressurized fluid supplied into the piston cavity exerts a force against the bottom side of the booster piston to move the booster piston upwards to move the valve from an open position to a closed position.

In certain embodiments, the apparatus also has a bulkhead extending between the bottom surface of the piston cavity and the top surface of the lower cavity. The bulkhead can have a central opening sized to allow the actuator stem to extend therethrough. The booster piston can have a piston sealing means to create a fluid seal between an outer surface of the booster piston and an inner surface of the upper inner bore of the piston cavity. The booster piston can also have an alignment bearing housed in an upper circular exterior groove of the booster piston to maintain the axial alignment of the booster piston within the upper inner bore of the piston cavity.

In another alternative embodiment of the present invention, an apparatus for closing a valve can include a valve actuator. The valve actuator includes a cylindrical actuator housing having a central axis. A piston head is located at an upper end of actuator housing. The apparatus has an actuator piston, the actuator piston having a lower end located within the actuator housing and connected to a valve stem which actuates the valve. The upper end of the actuator piston has an actuator stem which extends upwards along the central axis and out of the piston head. A lower cavity of a booster housing is detachably connected to an upper end of the piston head. A booster piston is located in a piston cavity of the booster housing. The booster piston is detachably connected to a top end of the actuator stem, so that upward movement of the booster piston will actuate the valve and move the valve towards a closed position.

In certain embodiments, a bulkhead extends between a bottom surface of the piston cavity and top surface of the lower cavity. The bulkhead has a central opening extending from the bottom surface of the piston cavity to the top surface of the lower cavity and is sized to allow the actuator stem to extend therethrough. The lower cavity can have internal threads configured to mate with external threads of the piston head for detachably connecting the lower cavity to the piston head. A screw opening in the booster housing can be configured to allow a set screw to pass into the lower cavity and engage the piston head to limit relative movement between the piston head and the booster housing.

In certain other embodiments, the booster piston has an external thread profile configured to mate with an internal thread profile on the top end of the actuator stem to detachably connect the booster piston to the actuator stem. The booster piston can alternatively have an internal thread profile configured to mate with an external thread profile on the top of actuator stem to detachably connect the booster piston to the actuator stem.

In another embodiment of the current invention, a method for assisting a valve actuator to close a valve includes releasably attaching a lower cavity of a booster housing of a booster to a piston head of the valve actuator, the booster comprising a booster piston. A top end of an actuator stem of the valve actuator is releasably attached to a bottom side of the booster piston. An added force is exerted on the actuator stem with the booster piston, causing the actuator stem to move upwards and actuate the valve, moving the valve towards a closed position.

In certain embodiments, the method can also include cutting a wire which extends through the valve as the valve moves towards the closed position. The booster can have a piston cavity and injecting pressurized fluid through a fluid supply port in fluid communication with the piston cavity to exert the added force on the actuator stem.

In other embodiments, internal booster threads formed on an inner surface of a lower cavity of the booster housing can be mated with external cap threads of the valve actuator. A thread profile on the bottom side of the booster piston can be mated with a thread profile on the top end of the actuator stem.

BRIEF DESCRIPTION OF DRAWINGS

Some of the features and benefits of the present invention having been stated, others will become apparent as the description proceeds when taken in conjunction with the accompanying drawings, in which.

Figure 1:
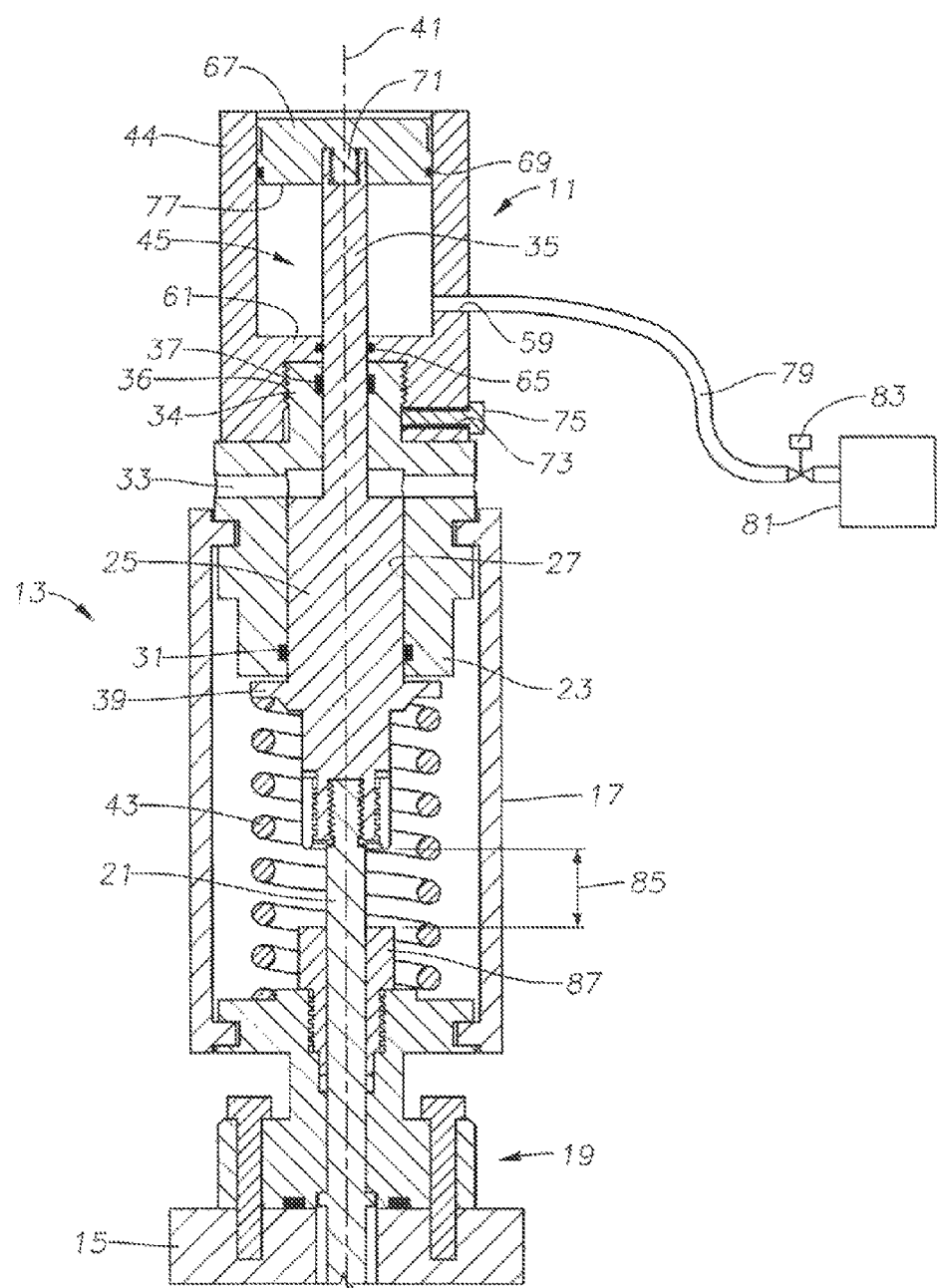
FIG. 1 is a schematic sectional view of an actuator in an upper valve closed position with a power assist closed device in accordance with an embodiment of this invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1, is an example of a power assist closed device, or booster, 11 attached to a top end of valve actuator 13. In the embodiment of FIG. 1, valve actuator 13 is a hydraulic piston type actuator for actuating valve 15. Valve actuator 13 includes actuator housing 17, which is connected to bonnet 19. Valve stem 21 extends downward through actuator housing 17 and actuates valve 15. Piston head 23, also called a power head, is mounted to an upper end of actuator housing 17. Piston head 23 has a generally cylindrical outer surface with a groove that accepts a radially inward projecting lip of actuator housing 17. Actuator piston 25, which is substantially cylindrical, coaxially mounts within actuator piston chamber 27 of actuator piston head 23. Actuator seals 31 form a seal between an external surface of actuator piston 25 and an inner surface of actuator piston chamber 27. Actuator ports 33 are each apertures radially extending through actuator piston head 23 and are used to introduce pressurized media into actuator piston chamber 27, or for releasing media from actuator piston chamber 27.

Actuator piston 25 has an actuator stem 35 which extends upward at an upper end of actuator piston 25. Above ports 33, actuator piston head 23 reduces in diameter to define an actuator cap 34. Actuator stem 35 extends axially out of actuator piston head 23 through the actuator cap 34 of actuator piston head 23. Stem seal assembly 37 forms a seal between the inner surface of the opening in actuator cap 34 and actuator stem 35. Actuator cap 34 can have external cap threads 36 located on its outer surface.

Actuator piston 25 has a downstop 39 at its lower end which is connected to valve stem 21 so that movement of actuator piston 25 and actuator stem 35 along axis 41 results in axial movement of valve stem 21. Diameter of downstop 39 is greater than diameter of piston 25 to define an upward facing shoulder that is in interfering contact with a lower end of piston head 23. Actuator stem 35 and valve stem 21 are co-axial and therefore share axis 41. Although actuator piston 25 and downstop 39 are shown as a single member, actuator piston 25 and downstop 39 may be two separate members which are secured together to prevent relative movement between actuator piston 25 and downstop 39 when actuator stem 35 is moved in either an upward or downward direction along axis 41. Spring 43 upwardly urges downstop 39, and thus valve stem 21 and actuator piston 25.

Figure 2:
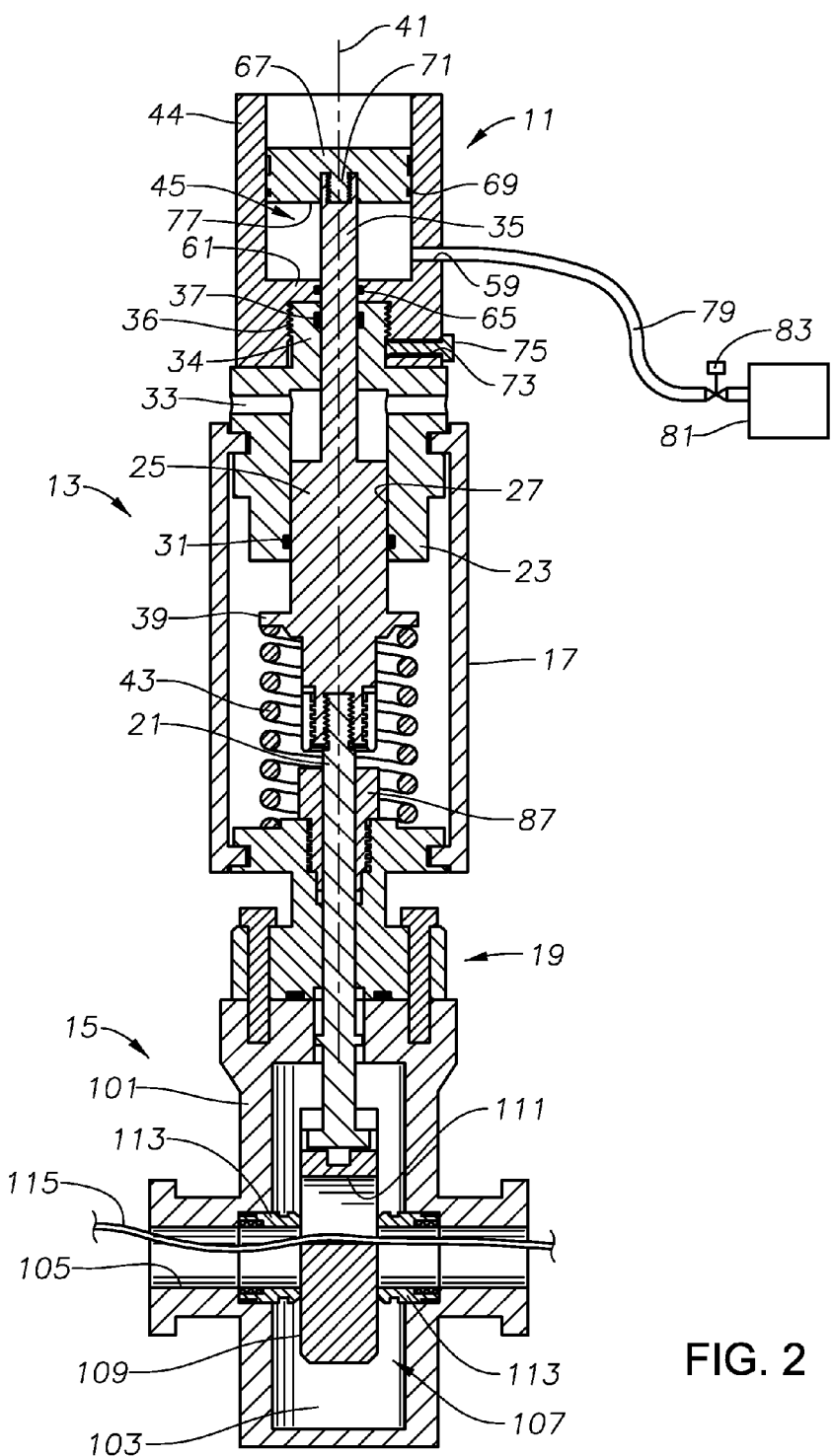
FIG. 2 is a schematic sectional view of a valve in a partially open position with a power assist closed device of FIG. 1 in accordance with an embodiment of this invention.
Figure 3:
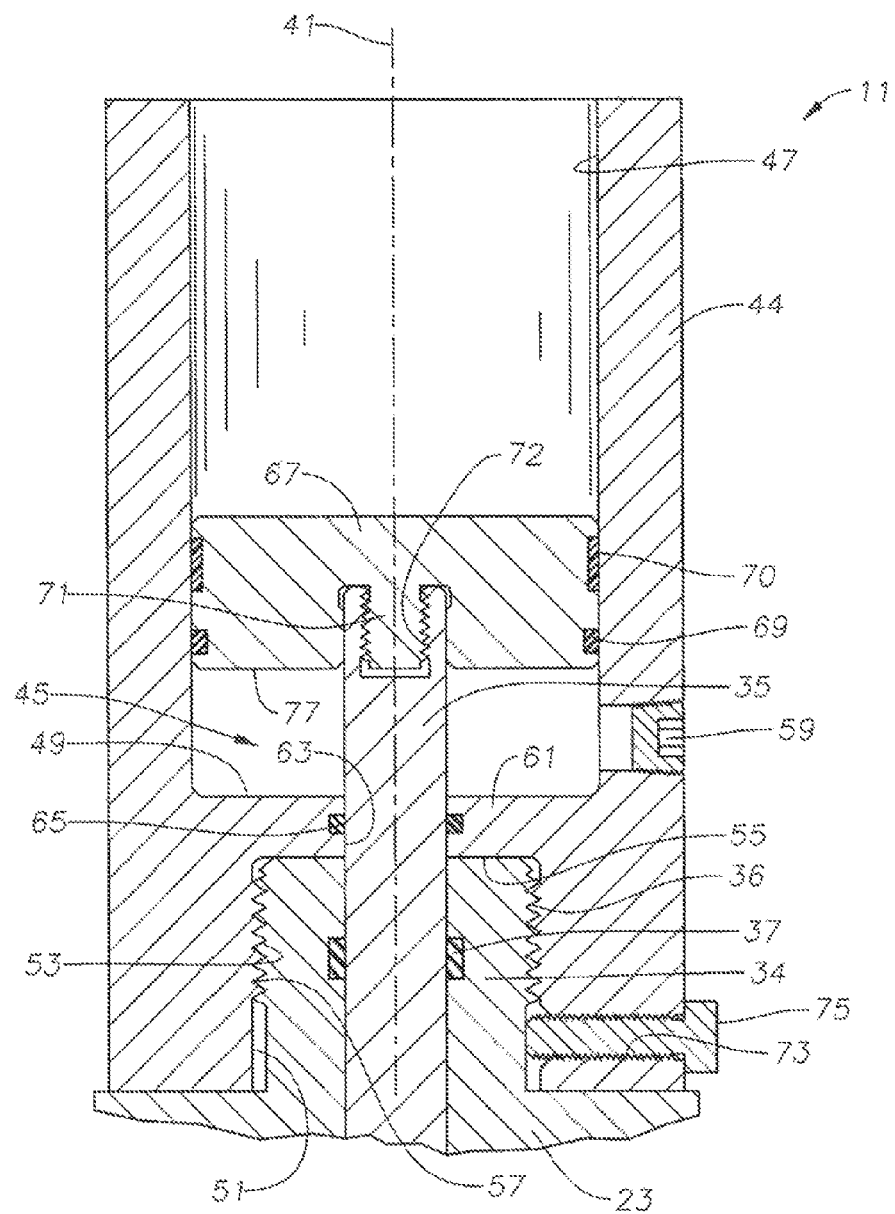
FIG. 3 is a sectional view of a power assist closed device of FIG. 1 in a lower valve open position, in accordance with an embodiment of this invention.
Figure 4:
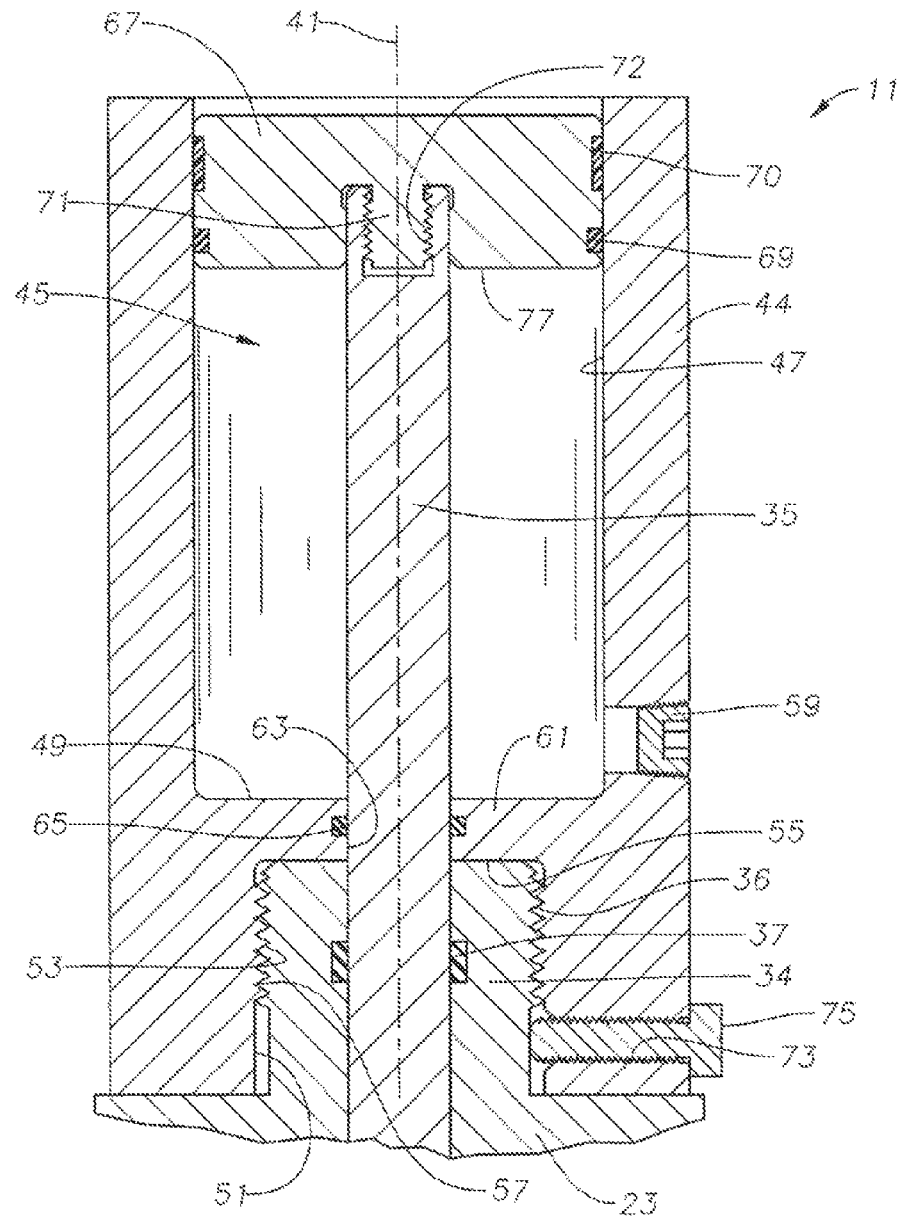
FIG. 4 is a sectional view of the power assist closed device of FIG. 1, in an upper valve closed position, in accordance with an embodiment of this invention.

Shown in FIG. 2 is an example of a valve 15 that could be mated with booster 11. Valve 15 is a gate valve with a body 101 housing a chamber 103 therein and a passage 105 formed through the body 101 that intersects the chamber 103. A gate 107 is shown within the chamber 103 that is a generally planar member having a solid portion 109 and an opening 111 formed through the solid portion 109. The gate 107 is selectively slidable within the chamber 103. Annular valve seats 113 are shown co-axially disposed in the passage 105, each having an end extending into the chamber 103. In the embodiment of the valve 15 shown in FIG. 2, the opening 111 is partially registered with the passage 105 and a wire 115 extends through the passage 105 and opening 111. Wire 115 can be, for example, a wireline or can be a tubular member that extends through valve 15.

Although valve actuator 13 is shown and described herein as a hydraulic piston type actuator, and valve 15 is described as a gate valve, booster 11 can be utilized with any actuator that has a top shaft or rising stem that is directly or indirectly connected to a valve stem of any type of valve that moves axially.

As shown in FIGS. 1-4, booster 11 has a cylindrical booster housing 44 with an upward facing piston cavity 45 defined by an upper inner bore 47 and an upward facing bottom surface 49. Piston cavity 45 can have a fluid supply port 59 in fluid communication with upper inner bore 47. Fluid supply port 59 extends from an exterior of booster housing 44 and into upper inner bore 47. Fluid supply port 59 can be used to inject a pressurized fluid into piston cavity 45. A pressurized fluid supply line 79 can fluidly connect the pressurized fluid supply source 81 to fluid port 59. A solenoid valve 83 may be used to regulate the flow of pressurized fluid from the supply source 81 to piston cavity 45. For example, solenoid valve 83 can be used to provide pressurized fluid to booster 11 at any point during the return cycle stroke as the valve 15 is moving to a closed position.

A booster piston 67 is located within piston cavity 45. Booster piston 67 can be a cylindrical member and have a lower circular exterior groove on its outer circumference in which to locate piston sealing means 69. Piston sealing means 69 creates a fluid seal between an outer surface of booster piston 67 and an inner surface of upper inner bore 47 of piston cavity 45. An alignment bearing 70 can be located in an upper circular exterior groove of booster piston 67. Alignment bearing 70 maintains the axial alignment of booster piston 67 within the upper inner bore 47 of piston cavity 45.

Booster piston 67 has a piston mounting means 71 located on bottom side 77 of booster piston 67 for detachably connecting the actuator stem 35 to the booster piston 67 when booster 11 is mounted on a valve actuator 13. Piston mounting means 71 can comprise a thread profile on the booster piston 67 that mates with a thread profile 72 on the top end of the actuator stem 35. For example, booster piston 67 can have external threads for selectively coupling to, and mating with, internal threads of a top end of actuator stem 35, as shown. Alternatively, piston mounting means 71 can comprise a cavity with internal threads for mating with external threads at the top end actuator stem 35, or can comprise other mating means known to one with ordinary skill in the art.

Booster 11 also has a downward facing lower cavity 51. Lower cavity 51 is defined by lower inner bore 53 and a downward facing top surface 55. Lower cavity 51 can have internal booster threads 57 formed on the surface of lower inner bore 53 for mating with external cap threads 36 of valve actuator 13 and detachably connecting piston head 23 to booster 11. Lower cavity 51 has a screw opening 73 radially extending through booster housing 44 from an exterior of booster housing 44 and into lower inner bore 53. Screw opening 73 allows for a set screw 75 to pass into lower cavity 51 and engage actuator piston head 23 to limit relative movement between actuator piston head 23 and booster 11 when booster 11 is mounted on a valve actuator 13.

Piston cavity 45 and lower cavity 51 are separated by a bulkhead 61. Bulkhead 61 is generally perpendicular to axis 41 and extends between bottom surface 49 of piston cavity 45 and top surface 55 of lower cavity 51. Bulkhead 61 has a central opening 63 extending from the bottom surface 49 of piston cavity 45 to the top surface 55 of lower cavity 51. Central opening 63 is sized to allow actuator stem 35 to extend therethrough. A bulkhead sealing member 65 creates a fluid seal between the outer surface of actuator stem 35 and the inner surface of central opening 63 of bulkhead 61.

In FIG. 1, actuator piston 25 is shown in the upper position. When actuator piston 25 is in the upper position, valve 15 would be in a closed position. Actuator piston 25 can move downward a piston stroke distance 85 until the bottom downward facing surface of actuator piston contacts an actuator block 87, which is located at a lower end of actuator housing 17 and connected to bonnet 19. As actuator piston 25 moves downward, valve 15 moves from an upper closed position to a lower open position. The diameter of the booster piston 67, length of piston stroke 85, and the outer diameter of booster housing 44 can be sized to meet the required design specification for the valve 15 and valve actuator 13 to which booster 11 will be connected.

In operation, which an operator desires to assist valve actuator 13 to close valve 15, booster 11 can be mounted onto valve actuator 13. To do so, lower cavity 51 of booster 11 can be releasably attached to piston head 23 of valve actuator 13. This can be accomplished by screwing lower cavity 51 onto the actuator cap 34 to mate the internal booster threads 57 formed on the surface of lower inner bore 53 with the external cap threads 36 of valve actuator 13.

The actuator stem 35 can then be detachably connected to the booster piston with piston mounting means 71 located on bottom side 77 of booster piston 67. Piston mounting means 71 can comprise a thread profile on the booster piston 67 that mate with a thread profile 72 on the top end of the actuator stem 35. For example, booster piston 67 can have external threads for mating with internal threads of a top end of actuator stem 35, as shown. Alternatively, piston mounting means 71 can comprise a cavity with internal threads for mating with external threads at the top end actuator stem 35.

In order to assist the valve actuator 13 in moving the valve 15 to the closed position, pressurized fluid is injected through the fluid port 59 in the piston cavity 45. The fluid acts on and exerts force on the bottom side 77 of booster piston 67 to force the booster piston 67 to move upwards in the piston cavity 45 along axis 41. This upward movement of the booster piston 67 causes the actuator stem 35 to move upwards and actuate the valve 15 and move the valve 15 towards the closed position. The forces applied to the bottom side 77 of booster piston 67 by the pressurized fluid can be high enough to supply sufficient closing forces to cut a wire 115 which extends through the valve 15 as the valve 15 moves towards the closed position (FIG. 2).

During these operations, the supply of pressurized fluid from the supply source 81 to piston cavity 45 can be regulated with solenoid valve 83 so that pressurized fluid is injected into booster 11 at specified points during the return cycle stroke as the valve 15 is moving to a closed position. This can be used, for example, to increase the supply and thus the forces exerted on the booster piston 67 at the point in which the valve 15 is about to close around a wire 115 passing through the valve 15 so that the valve 15 can having sufficient closing forces to cut through the wire 115 (FIG. 2).

The apparatus described herein has significant advantages. It is desirable to be able to use a simple actuator, such as a mechanical single acting fail safe close actuator, for normal oil and gas well fracturing and producing operations rather than using a costly double acting actuator. This invention allows the simpler actuator to be used and then the booster 11 of this invention can be attached to the valve actuator 13, as describe herein, if needed to assist the valve 15 in moving to a closed position or to assist valve 15 in cutting wire 115 while moving to a closed position.

The terms "vertical", "horizontal", "upward", "downward", "top", and "bottom" are used herein only for convenience because valve 15 may be installed in various positions, other than with the valve stem 21 pointing upward.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. An apparatus for assisting a valve actuator to close a valve, the apparatus comprising:
    a cylindrical booster housing with a central axis, the booster housing comprising:
        a piston cavity open towards a first direction;
        a lower cavity open in a second direction that is opposite the first direction, the lower cavity having internal threads for selectively coupling with external threads of a piston head of the valve actuator that moves the actuator stem between an extended open position and a retracted closed position; and
        a bulkhead formed between the piston cavity and the lower cavity, the bulkhead being static relative to the piston cavity and the lower cavity and having a central opening for selectively accepting therethrough an actuator stem of the valve actuator; and
    a booster piston located within the piston cavity, the booster piston having a piston mounting connection located on a bottom side of the booster piston for selectively securing a top end of the actuator stem of the valve actuator to the booster piston, wherein the booster piston is moveable axially in the first direction to move the valve from the extended open position to the retracted closed position.

2. The apparatus of claim 1, wherein the piston cavity has a fluid supply port extending from an outer surface of the booster housing to an upper inner bore of the piston cavity for injecting pressurized fluid into the piston cavity for causing the booster piston to move in the first direction.

3. The apparatus of claim 2, wherein the apparatus further comprises a solenoid valve connected to a pressurized fluid supply line, the solenoid valve operable to regulate the delivery of pressurized fluid to the piston cavity.

4. The apparatus of claim 1, wherein the piston mounting connection comprises a thread profile on the booster piston that selectively mates with a thread profile on the top end of the actuator stem.

5. The apparatus of claim 1, wherein the apparatus further comprises:
    a bulkhead seal to create a fluid seal between an outer surface of the actuator stem and an inner surface of the central opening of the bulkhead; and
    a piston sealing means to create a fluid seal between an outer surface of the booster piston and an inner surface of the piston cavity.

6. The apparatus of claim 1, wherein the booster housing further comprises a screw opening configured to allow a set screw to pass into the lower cavity and engage the piston head to limit relative movement between the piston head and the booster housing.

7. The apparatus of claim 1, wherein the booster piston further comprises an alignment bearing for maintaining the axial alignment of the booster piston and the piston cavity.

8. An apparatus for assisting a valve actuator to close a valve, the apparatus comprising:
    an upward facing piston cavity, the piston cavity defined by an upper inner bore of a booster housing and an upward facing bottom surface, wherein the bottom surface is static relative to the upper inner bore;
    a fluid supply port extending from an exterior of the booster housing and into the upper inner bore of the piston cavity for supplying a pressurized fluid into the piston cavity;
    a downward facing lower cavity, the lower cavity defined by a lower inner bore of the booster housing and a downward facing top surface, wherein the top surface is static relative to the lower inner bore;
    internal booster threads formed on an inner surface of the lower inner bore for selectively mating with external threads of the valve actuator; and
    a booster piston located within the piston cavity, the booster piston having a thread profile located on a bottom side of the booster piston for selectively mating with a thread profile on a top end of an actuator stem of the valve actuator that moves the actuation stem between an extended open position and a retracted closed position, wherein the pressurized fluid supplied into the piston cavity exerts a force against the bottom side of the booster piston to move the booster piston upwards to move the valve from an open position to a closed position by moving the actuator stem from the extended open position to the retracted closed position.

9. The apparatus of claim 8, wherein the apparatus further comprises a bulkhead extending between the bottom surface of the piston cavity and the top surface of the lower cavity, the bulkhead having a central opening sized to allow the actuator stem to extend therethrough.

10. The apparatus of claim 8, wherein the booster piston further comprises:
    a piston sealing means to create a fluid seal between an outer surface of the booster piston and an inner surface of the upper inner bore of the piston cavity; and
    an alignment bearing housed in an upper circular exterior groove of the booster piston to maintain the axial alignment of the booster piston within the upper inner bore of the piston cavity.

11. An apparatus for closing a valve, the apparatus comprising:
- a valve actuator for moving the actuator stem between an extended open position and a retracted closed position, the valve actuator comprising:
  - a cylindrical actuator housing having a central axis;
  - a piston head located at an upper end of the actuator housing; and
  - an actuator piston, the actuator piston having a lower end located within the actuator housing and connected to a valve stem which actuates the valve, wherein an upper end of the actuator piston comprises an actuator stem which extends upwards along the central axis and out of the piston head;
  - a lower cavity of a booster housing detachably connected to an upper end of the piston head; and
- a booster piston located in a piston cavity of the booster housing, the piston cavity being static relative to the booster housing, the booster piston being detachably connected to a top end of the actuator stem, so that upward movement of the booster piston will actuate the valve and move the valve towards a closed position by moving the actuator stem from the extended open position to the retracted closed position.

12. The apparatus of claim 11, further comprising a bulkhead extending between a bottom surface of the piston cavity and top surface of the lower cavity, the bulkhead having a central opening extending from the bottom surface of piston cavity to the top surface of the lower cavity and sized to allow the actuator stem to extend therethrough.

13. The apparatus of claim 11 wherein the lower cavity comprises:
- internal threads configured to mate with external threads of the piston head for detachably connecting the lower cavity to the piston head; and
- a screw opening through the booster housing configured to allow a set screw to pass into the lower cavity and engage the piston head to limit relative movement between the piston head and the booster housing.

14. The apparatus of claim 11, wherein the booster piston has an external thread profile configured to mate with an internal thread profile on the top end of said actuator stem to detachably connect the booster piston to the actuator stem.

15. The apparatus of claim 11, wherein the booster piston has an internal thread profile configured to mate with an external thread profile on the top of said actuator stem to detachably connect the booster piston to the actuator stem.

16. A method for assisting a valve actuator to close a valve, the method comprising:
- (a) releasably attaching a lower cavity of a booster housing of a booster to a piston head of the valve actuator that moves an actuator stem between an extended open position and a retracted closed position, the booster comprising a booster piston;
- (b) releasably attaching a top end of the actuator stem of the valve actuator to a bottom side of the booster piston; and
- (c) exerting an added force on the actuator stem with the booster piston causing the actuator stem to move from the extended open position to the retracted closed position.

17. The method of claim 16, wherein step (c) further comprises cutting a wire which extends through the valve as the valve moves towards the closed position.

18. The method of claim 16, wherein the booster further comprises a piston cavity that is static relative to a booster housing and step (c) comprises injecting pressurized fluid through a fluid supply port in fluid communication with the piston cavity to exert the added force on the actuator stem.

19. The method of claim 16, wherein step (a) comprises mating internal booster threads formed on an inner surface of said lower cavity of the booster housing with external cap threads of the piston head.

20. The method of claim 16, wherein step (b) comprises mating a thread profile on the bottom side of the booster piston with a thread profile on the top end of the actuator stem.

* * * * *